United States Patent
Theriault

(10) Patent No.: US 10,708,658 B2
(45) Date of Patent: Jul. 7, 2020

(54) VIDEO VIEWING EXPERIENCE ENHANCEMENT THROUGH CUSTOM CURATION

(71) Applicant: Richard Theriault, Lincoln, MA (US)

(72) Inventor: Richard Theriault, Lincoln, MA (US)

( * ) Notice: Subject to any disclaimer, the term of this patent is extended or adjusted under 35 U.S.C. 154(b) by 0 days.

(21) Appl. No.: 16/013,999

(22) Filed: Jun. 21, 2018

(65) Prior Publication Data

US 2018/0376200 A1 Dec. 27, 2018

Related U.S. Application Data

(60) Provisional application No. 62/523,661, filed on Jun. 22, 2017.

(51) Int. Cl.
| | |
|---|---|
| *H04N 21/458* | (2011.01) |
| *H04N 21/442* | (2011.01) |
| *G06F 16/735* | (2019.01) |
| *H04N 21/2668* | (2011.01) |
| *H04N 21/6543* | (2011.01) |
| *H04N 21/258* | (2011.01) |
| *H04N 21/24* | (2011.01) |
| *H04N 21/262* | (2011.01) |

(52) U.S. Cl.
CPC ......... *H04N 21/458* (2013.01); *G06F 16/735* (2019.01); *H04N 21/2407* (2013.01); *H04N 21/25891* (2013.01); *H04N 21/262* (2013.01); *H04N 21/2668* (2013.01); *H04N 21/44213* (2013.01); *H04N 21/6543* (2013.01)

(58) Field of Classification Search
CPC ........... H04N 21/458; H04N 21/25891; H04N 21/6543; H04N 21/2668; H04N 21/44213; H04N 21/2407; H04N 21/262; H04N 21/4532; H04N 21/4542; H04N 21/440245; H04N 21/4755; H04N 21/4668; G06F 16/735
USPC ........................................................... 725/34
See application file for complete search history.

(56) References Cited

U.S. PATENT DOCUMENTS

| | | | |
|---|---|---|---|
| 6,771,316 B1* | 8/2004 | Iggulden .................. | H04N 5/44 348/460 |
| 8,949,886 B2 | 2/2015 | Acharya et al. | |
| 9,021,518 B2 | 4/2015 | Theriault | |
| 9,479,801 B2 | 10/2016 | Higgs et al. | |
| 2002/0087403 A1* | 7/2002 | Meyers .................. | G06Q 30/02 705/14.64 |
| 2004/0261096 A1* | 12/2004 | Matz ...................... | H04N 7/163 725/28 |

(Continued)

*Primary Examiner* — Cynthia M Fogg
(74) *Attorney, Agent, or Firm* — Kintner IP, LLC; Mary Frances Ludwig

(57) ABSTRACT

A system and method for replacing undesirable content in a media stream provides viewers with a highly individualized video viewing experience. A monitoring station detects undesirable content and selects substitute content based upon user preferences stored in a system database. The substitute content may have attributes related to both the primary content being viewed and the user preferences. A first trigger signal is transmitted to an output device which transmits media to the user's display. In response to the first trigger signal, the output device switches from the first media stream to a second media stream containing the substitute content. In embodiments, undesirable content is detected and substituted for in real-time.

14 Claims, 5 Drawing Sheets

(56) References Cited

U.S. PATENT DOCUMENTS

2009/0222853 A1\* 9/2009 White .................... H04N 7/163
                                                                 725/34
2015/0370818 A1\* 12/2015 Des Jardins .......... G06F 16/435
                                                                 707/734

\* cited by examiner

| Content | Attribute status | | | | | |
|---|---|---|---|---|---|---|
| Game 1 | | | | | | |
| Football | --------- Y --------- | | | | | |
| NFC East | --------- Y --------- | | | | | |
| Halftime | ------ N ------ | Y | ------ N ------ | | | |
| Blowout | --------- N --------- | | | | Y | |
| Game 2 | | | | | | |
| Football | --------- Y --------- | | | | | |
| NFC East | --------- Y --------- | | | | | |
| Halftime | ------ N ------ | Y | ------ N ------ | | | |
| Blowout | --------- N --------- | | | | Y | |
| Game 3 | | | | | | |
| Football | --------- Y --------- | | | | | |
| Patriots | --------- Y --------- | | | | | |
| Blowout | --------- N --------- | | ------ Y ------ | | N | |
| Game 4 | | | | | | |
| Baseball | --------- Y --------- | | | | | |
| | t0 | t1 t2 | t3 | | t4 | t5 |

| User Profiles | Displayed content (Game) | | | | | |
|---|---|---|---|---|---|---|
| Tom | 1 | 2 | 1 | | 4 | |
| :) Football | | | | | | |
| :) Baseball | | | | | | |
| :( Halftime | | ✶ | ✶ | | | |
| :( Blowout | | | | | ✶ | |
| Dick | 3 | | 1 | | 3 | |
| :) Football | | | | | | |
| :) Halftime | | | | | | |
| :( Blowout | | ✶ | | ✶ | | |
| Harry | 1 | 3 | 1 | | 3 | |
| :) Football | | | | | | |
| :) Patriots | | | | | ✶ | |
| :( Blowout | | | | | | |
| :( Halftime | | ✶ | ✶ | | | |
| | t0 | t1 t2 | t3 | | t4 | t5 |

FIG. 4

VIDEO VIEWING EXPERIENCE ENHANCEMENT THROUGH CUSTOM CURATION

CROSS REFERENCE TO RELATED APPLICATION

This application claims the filing benefit under 35 U.S.C. § 119(e) of U.S. Provisional Application No. 62/523,661, filed 22 Jun. 2017, which is hereby incorporated by reference.

TECHNICAL FIELD

The present invention pertains generally to video viewing, and more particularly to methods and systems for facilitating an enhanced video viewing experience reflective of individual viewing preferences.

BACKGROUND OF THE INVENTION

When viewing long-form video content, for a variety of reasons a viewer may wish to temporarily watch other content. Systems exist which allow the user to time-shift a program by recording it for later viewing, allowing them to quickly skip any undesirable content when viewing. However, a user may not wish to watch a program on a time delay.

When watching non-time-shifted content, commonly a viewer may manually switch between content sources when undesirable content is presented. The user may switch back to the original content often, to see if the undesirable portion of the program has ended. Such channel surfing is fairly common among sports fans, who may be interested in multiple live games during any one time slot.

There is a need in the art for a system which can predict times during a program when a viewer may wish to be provided with alternate content, provide such content based on predicted or input user preferences, and return automatically to the original content when appropriate.

BRIEF SUMMARY OF THE INVENTION

The present invention is directed to a system and method for replacing undesirable content in a media stream. The undesirable content may be detected by a monitoring station and substitute content may be selected by the same; both undesirable and substitute content are linked to a custom user profile accessible by the monitoring station. The system and method allows viewers to experience an individualized, more enjoyable version of any video content they currently enjoy.

In accordance with one embodiment, a monitoring station detects undesirable content in a first media stream, wherein the undesirable content corresponds to a user preference stored in a system database. The monitoring station selects substitute content having a substitute content attribute associated with a primary content attribute of the first media stream. A first trigger signal is transmitted to an output device which transmits media to the user's display. In response to the first trigger signal, the output device switches from the first media stream to a second media stream containing the substitute content.

In embodiments, the monitoring station monitors the first media stream for an end to undesirable content. When an end to undesirable content is detected, the monitoring station transmits a second trigger signal to the output device, and the output device switches from the second media stream to the first media stream.

In accordance with another embodiment, the substitute content has a substitute content attribute associated with a user preference stored in the system database.

In accordance with another embodiment, prior to transmitting the first trigger signal, the monitoring station monitors the first media stream for undesirable content.

In accordance with another embodiment, the monitoring station assigns a substitute content attribute to substitute content and stores the substitute content attribute in the system database.

In accordance with another embodiment, the system database stores, a plurality of substitute content attributes and a directory of substitute content, each substitute content having a substitute content attribute. The monitoring station associates at least one of the plurality of substitute content attributes with the primary content attribute, and analyzes substitute content attributes associated with the primary content attribute for correspondence to a user preference.

In accordance with another embodiment, undesirable content in the first media stream is detected in real-time.

In accordance with another embodiment, the system solicits a user preference corresponding to the substitute content.

Further provided is an article comprising a tangible medium that is not a transitory propagating signal encoding computer-readable instructions that, when applied to a computer system, instruct the computer system to perform any of the methods of replacing undesirable content described herein.

Further provided is an output device in communication with a monitoring station and configured to execute transmission of media to a user in accordance with any of the methods of replacing undesirable content described herein.

Other embodiments, in addition to the embodiments enumerated above, will become apparent from the following detailed description, taken in conjunction with the accompanying drawings, which illustrate, by way of example, the principles of the system and method of operation.

BRIEF DESCRIPTION OF THE DRAWINGS

FIG. 4 is a temporal diagram of content attributes and their effect on displayed content.

DETAILED DESCRIPTION OF THE INVENTION

Figure 1:
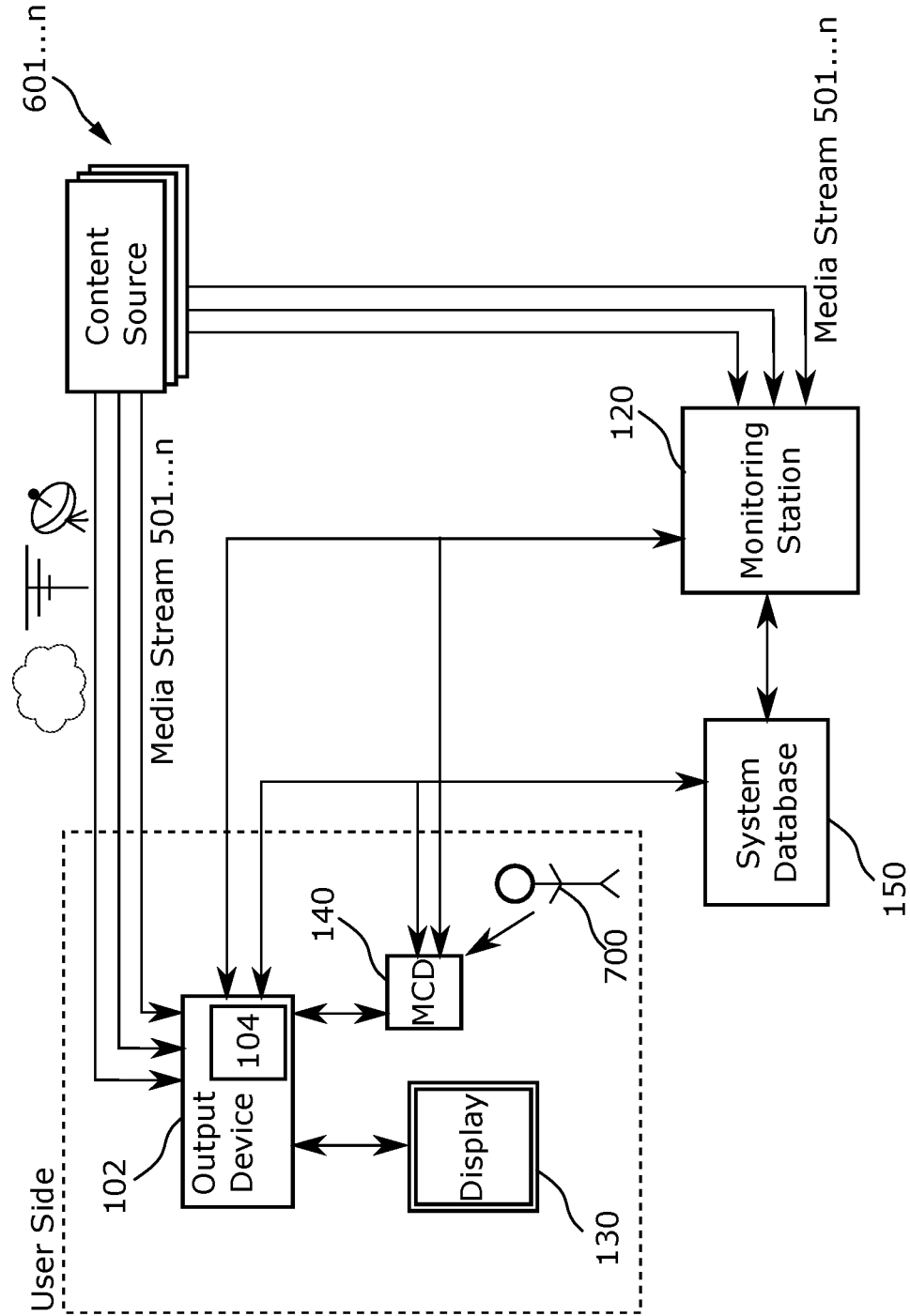
FIG. 1 is a schematic diagram of an embodiment of a system for replacing undesirable content in a media stream.

FIG. 1 is a schematic diagram of an embodiment of a system for replacing undesirable content in a media stream for viewing by a user. An output device 102 on the user side includes a network interface 104 in communication with a monitoring station 120. Network interface 104 receives one or more media streams 501-*n* from one or more content sources 601-*n*. Content sources 601-*n* may include cable, satellite, or over-the-air content providers, streaming content or video on demand providers, a networked content database, and other public or private network accessible content.

Output device 102 generally refers to a connected group of one or more hardware components on the user side which are collectively capable of communicating with monitoring station 120, receiving and switching between multiple media streams, and transmitting a media stream to a display 130. Output device 102 may include a set top box or subscriber device, a router, a network switch, a wired or wireless internet transceiver, an internet connected television or smart TV, or a short distance wireless communications transceiver, such as a RF, infrared, or Bluetooth transceiver. Display 130 may be integrated with output device 120 in a single piece of hardware.

User 700 interfaces with the system via a user interface, shown in the present embodiment as a software application installed on a mobile communication device, MCD 140, such as a cellular telephone, tablet, or computer. In the shown embodiment, MCD 140 is in direct communication with monitoring station 120 and a system database 150, through an internet or cellular network connection. In other embodiments, MCD 140 may directly connect to only one of monitoring station 120 or system database 150. MCD 140 is additionally in communication with output device 102, through an internet or short distance wireless connection. In yet another embodiment, the user interface may be installed on the output device and viewable on display 130.

Monitoring station 120 receives media streams 501-$n$ from content sources 601-$n$ and monitors the content of the media streams for a plurality of content attributes. Methods by which monitoring station 120 may receive media streams are discussed in U.S. Pat. No. 9,021,518 to Theriault. Information related to media streams and content attributes may be stored in system database 150. Monitoring station 120 may include may include one or more networked computers and may include hardware and software components. Content monitoring may be automated, such as by a predictive content analysis algorithm, or performed with manual input from an operator. System database 150 may similarly include one or more networked data storage devices.

Figure 2:
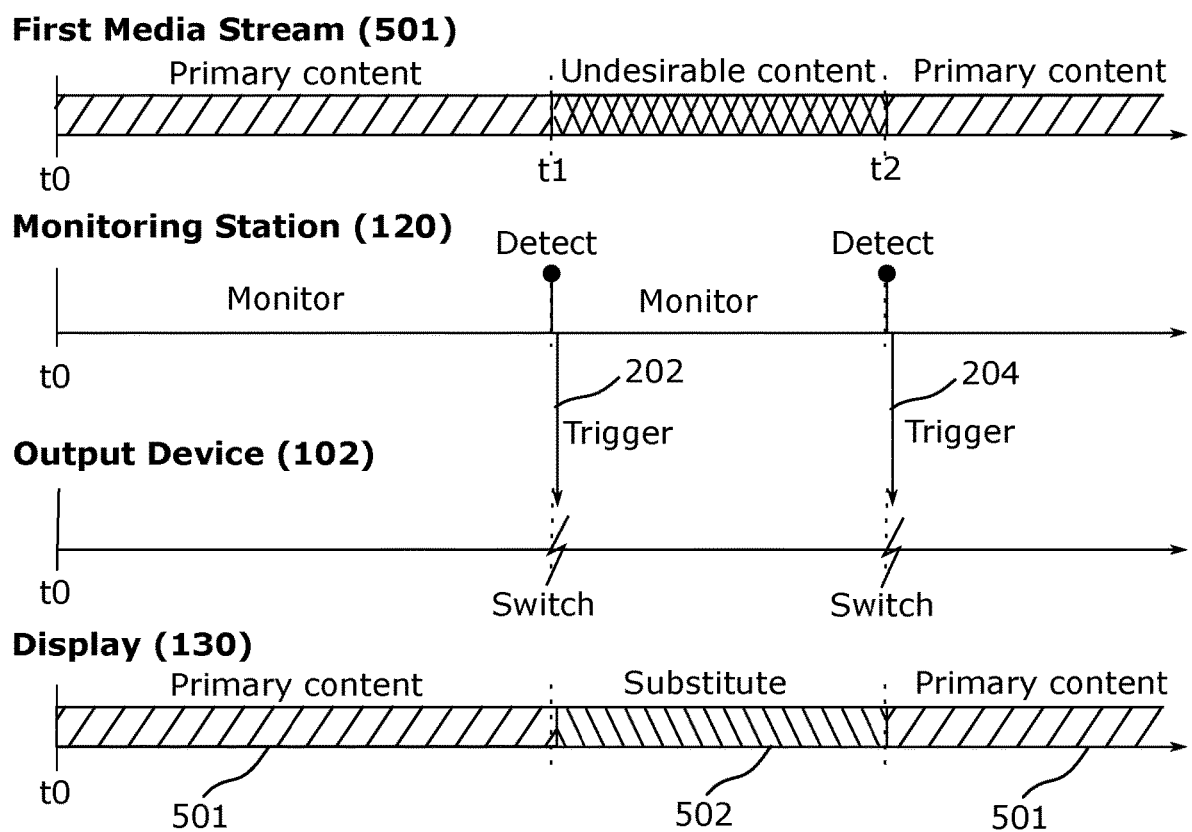
FIG. 2 is a timing diagram for a method of replacing the undesirable content.

FIG. 2 is a timing diagram for a method of replacing undesirable content in a media stream. Undesirable content may be any content which corresponds to a user preference indicating undesirability. User preferences are stored in the system database 150. User preferences may be directly provided by the user, for example in an initial setup stage; may learned by the system based on viewing habits; or may be based on user provided feedback related to content in media streams. The term user preference is used generally to describe both likes and dislikes associated with a specific user. More specifically, user preferences for consideration when monitoring for undesirable content may apply to a variety of content types, for example: routinely occurring content, such as a commercial break or halftime in a sporting event; specific content types which routinely occur in specific programs, such as the weather portion of the nightly news, or the monologue portion of a late night talk show; situational content, such as a rain delay in a baseball game, or an early knockout finish in a mixed martial arts fight. Any type of content which a specific user generally does not desire to watch may be characterized with a user preference.

First media stream 501 includes primary content, which is typically content selected by a user 700, and also contains undesirable content which begins at time t1 and ends at time t2. In this example, primary content resumes at time t2. Monitoring station 120 detects the undesirable content in first media stream 501, and in response transmits a first trigger signal 202 to output device 102. Trigger 202 is shown to occur a brief time after the first detection event, which in turn is shown to occur a brief time after the start of undesirable content at t1. The shown timing is merely an example; predictive content analysis may permit some of these events to occur nearly simultaneously, or with barely perceptible delay.

In addition to transmitting first trigger signal 202, monitoring station 120 directs output device 102 to a second media stream 502 which contains substitute content. Substitute content may be selected from many different content sources, such as broadcast network content, cable network content, satellite network content, internet media, user generated content, shared content, content stored in the system database, and others. Directing the output device to the second media stream may be accomplished by, for example, pointing to a cable or satellite provider of the second media stream, providing an internet or local network address from which output device may access the second media stream, directly streaming the second media stream to the output device, or any other method which enables the output device to access the second media stream. In response to receiving first trigger signal 202, output device 102 switches the media being transmitted to display 130 from first media stream 501 to second media stream 502.

In the shown example, after transmitting the first trigger signal, monitoring station 120 continues to monitor the first media stream for an end to undesirable content, which occurs at time t2. When the end to undesirable content is detected, monitoring station 120 transmits a second trigger signal 204 to output device 102. In response to receiving the second trigger signal, the output device switches from the second media stream to the first media stream, and first media stream 501 is again shown on display 501.

Figure 3:
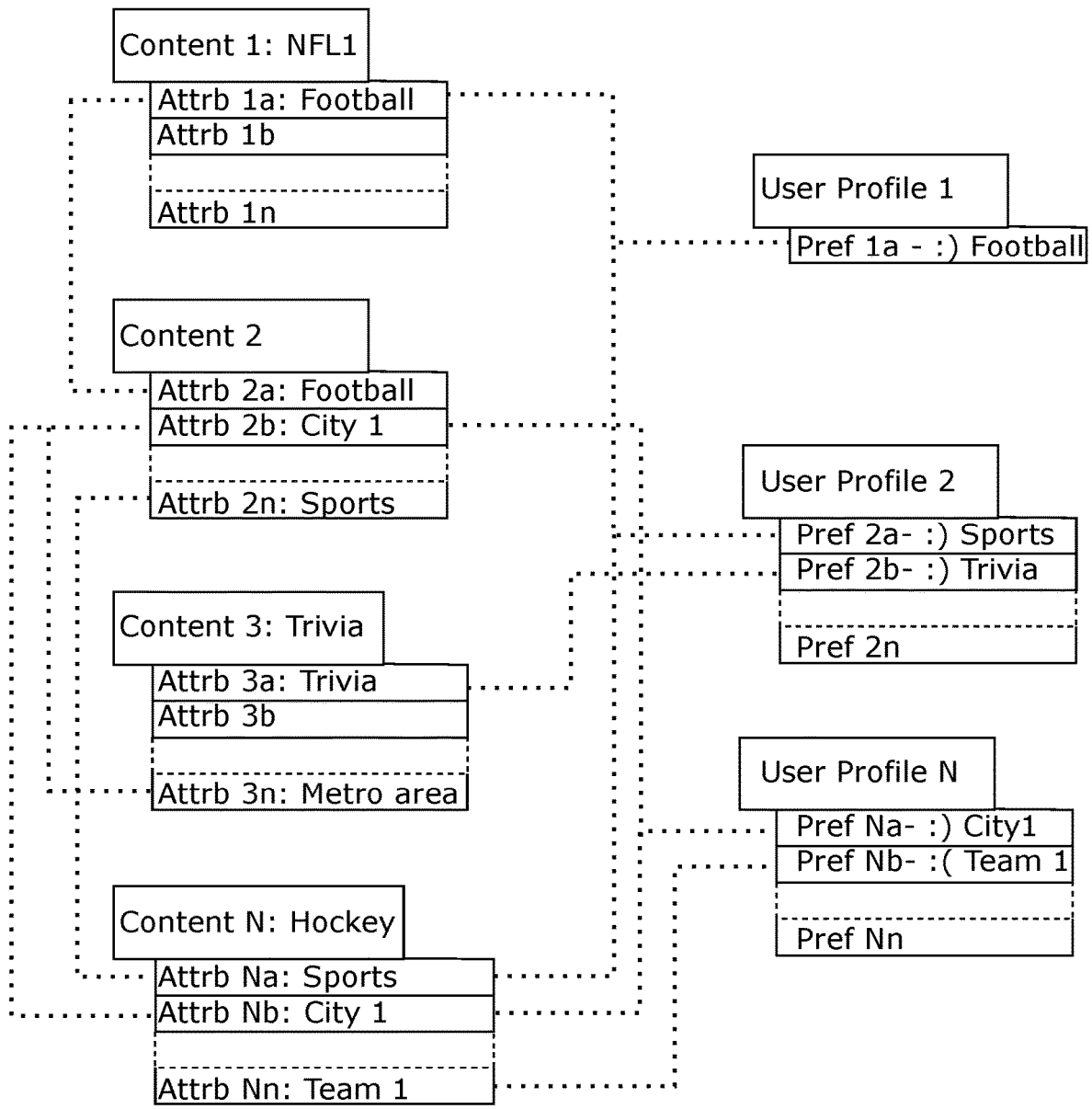
FIG. 3 is a diagram of example data types of the system.

The substitute content of the second media stream is selected by the monitoring station based upon content attributes of both the primary and substitute content. FIG. 3 is a diagram of some of the data types stored in system database 150. A plurality of content, 1-N are each associated with content attributes, labeled, e.g., attributes 1$a$, 1$b$, ... 1$n$. Content 1-N may belong to one or more of the content categories discussed herein, such as primary, undesirable, or substitute content. While the associations between content and attributes are stored in database 150, the content itself is not necessarily, but may be stored in database 150 as well.

Content attributes are descriptive of some characteristic of the content; some examples of content attributes follow. A group of genre attributes may include drama, news, sports, reality, documentary, and others. A group of location attributes may include various cities, states, and countries. A group of temporal attributes may include historic time periods, years in which programs are filmed or aired, holiday seasons, etc. A group of participant attributes may include a cast member, producer, sports team, announcer, reporter, etc. Other content attributes may relate to events, keywords, images, content providers, or combinations of other attributes.

For some content, content attributes may be transmitted to by a content provider to the monitoring station along with a media stream, such as a metadata indicating genre, content theme, etc. which may be provided with a cable television program. For some content, content attributes may be generated automatically by analysis software which cooperates with the monitoring station. For some content, content attributes may be manually input to the database, such as by an operator associated by the monitoring station or by one or more users of the system.

Substitute content may be short or long form content, and may be traditional video media, or non-traditional media such as trivia, interactive games, popular internet content, etc. Substitute content may be free of advertising or may contain non-traditional forms of advertising. Suitable substitute content is selected for a primary content stream based on associating or matching a substitute content attribute with at least one primary content attribute. Associated content attributes do not need to be identical matches, but merely related. However, associations may have a strength, such as a numeric indicator, which indicates how close two attributes are to being a match.

In FIG. 3, dotted lines connecting content attributes represent associations between these attributes. By way of example, let Content 1 be primary content (NFL game 1) having Attribute 1a: 'football'. Substitute content 2, 3, and N are evaluated by comparing their attributes with the primary content attributes. Content 2 has Attribute 2a, also 'football', which is associated with Attribute 1a. Content 2 may therefore be selected as a suitable substitute content for Content 1.

In another example, let Content 2 be the primary content and content 1, 3, and N be evaluated as substitute content. In addition to the previously mentioned match ('football') between attributes 1a and 2a, Content 2 has attributes 2b: 'City 1' and 2n: 'sports'. Content 3 has an attribute 3n: 'Metro area' which is associated with attribute 2b: 'City 1'. Content 3 in this example is trivia content related to the metro area around City 1. Content 3 is not necessarily related to sports or football. Content N, a hockey game, has attribute Na: 'sports' associated with attribute 2n of Content 2 and also has attribute Nb: 'City 1' associated with attribute 2b of Content 2. In this case, any of content 1, 3, or N may be selected as substitute content for Content 2.

In some embodiments, potential substitute content may be further evaluated for having a content attribute associated with a user preference. As discussed above, user preferences associated with a particular user are stored in the system database. As in the case of associating content attributes with one another, associating user preferences with content attributes may be based on exact match, near match, user feedback, automated analysis, or other means known in the art.

Refer again to the example of FIG. 3, where Content 2 is the primary content being watched by users 1-N who have corresponding User Profiles 1-N. Each User Profile 1-N includes a user preference of disliking halftime. When halftime begins in the football game of Content 2, substitute content is delivered to each user. Based only on the comparison of content attributes discussed above, any of content 1, 3, or N may be selected as substitute content for Content 2. However, based upon user preferences as well, the substitute content is further optimized for the user.

User 1 has a new profile, including only positive preference 1a of liking football. User likes and dislikes are indicated by the ascii emoticons for smiley and frowning faces, ':)' and ':('. Based on this preference, the system may provide user 1 with Content 1 as a substitute for halftime.

User 2 has preferences for liking sports and also liking trivia. Preference 2a: 'sports' is associated with attributes of potential substitute content 1 and N. Preference 2b: 'trivia' is associated with Content 3. In this case, the substitute content may be selected based on the strength of the match. For example, user 2 may have a stronger preference for trivia than for sports, indicating that Content 3 should be provided as a substitute.

User N has a preference for liking City 1, which results in a positive association with Content 3 and N. However User N, dislikes Team 1, resulting in a negative association with Content N. This negative association may outweigh the positive association, and result in Content 3 being provided as the substitute instead of Content N.

In some embodiments, the system may solicit user feedback corresponding to substitute content. The user may provide such feedback through the user interface by, for example, marking thumbs up or thumbs down, assigning a number of stars, or holding down a button for a certain time to indicate magnitude of like or dislike. The system may not solicit feedback on all content, but may in special circumstances, such as a when the system has little information to determine a match or when the information is potentially conflicting. Referring to the last example, User 1 may be asked for feedback to supplement their profile, which as a new user is limited. User N may be asked for feedback on Content 3, since they do not have an existing preference for trivia.

FIG. 4 illustrates an example of how content attributes may vary with time, and how changing attributes may impact which content is displayed to three users Tom, Dick, and Harry. Some content attributes, such as the event type (football or baseball game) or participating team (Patriots) are constant for the duration of the event. Other content attributes may switch on and off, or be associated or disassociated with the content. Such changes are indicated with N or Y (no or yes), for example, in a football game the attribute 'halftime' may be set to N, Y, then N again over the course of the game. Changes in attributes may be automatically or manually made at the monitoring station, or may be provided to the monitoring station by a user through the user interface. In the present embodiment, the monitoring station is monitoring games 1-4 for undesirable content in real time (i.e., without the content being time-shifted).

The users each have a profile in the system database which associates them with a number of user preferences. Tom, Dick, and Harry may be generally characterized as similar viewers, for example, they may be the same age and gender, prefer the same media genres, and live in the same geographic area. However, as the example illustrates, the user preferences enable the system to provide custom viewing experiences for each.

At time t0, Tom and Harry are watching Game 1. At time t1, the system detects that Game 1 has entered halftime, and the 'Halftime' content attribute is switched on. Tom and Harry each have a user preference of disliking halftime, as indicated by the '*' in their profiles at time t1. Because Tom has a user preference of liking football, and because the content of Game 2 is associated with the content of Game 1 (both have attribute 'NFC East'), Tom is switched to Game 2. Because Harry has a user preference of liking football and the Patriots, he is switched to Game 3, a Patriots game.

Dick was watching Game 3 at time to. At time t2, the system detects that Game 3 is a blowout as evidenced by the score spread or other metric. The 'Blowout' content attribute is switched on for Game 3. Dick and Harry, who are watching Game 3 at t2, both have a user preference of disliking blowouts. Dick likes halftime, and since Game 1 is still in halftime, the system displays Game 1 for Dick. However, for Harry, liking the Patriots outweighs his dislike of blowouts, therefore the system continues to display Game 3 for Harry.

At time t3, the system detects that halftime has ended in Game 1. The system switches back to displaying Game 1 for Tom and Harry, since it was their initially selected content.

At time t4, the system detects that Game 3 is no longer a blowout. The system switches back to displaying Game 3 for Dick, because it was his initially selected content.

At time t5, the system detects that Game 1 is now a blowout. Tom and Harry, who are watching Game 1 at t5, both have a user preference of disliking blowouts. The content of Game 4 is related to the content of Game 1 by the shared content attribute 'sports' (not shown, but related to attributes 'football' and 'baseball'). Tom has a user preference for baseball, and the system switches to displaying Game 4 for Tom. The system switches to displaying Game 3 for Harry, because Game 3 is a better match for his user profile at time t5.

In other embodiments, a user may notify the monitoring station that primary content has become undesirable to them. For example, a user may begin to find a sporting event boring when there is weak defensive play. The user may initiate a switch through the user interface. In some embodiments, the monitoring station may use that initiated switch to trigger substitute content for users with similar viewing habits. The monitoring station may automatically update content attributes, user preferences, or both in response to receiving the user request.

Figure 5:
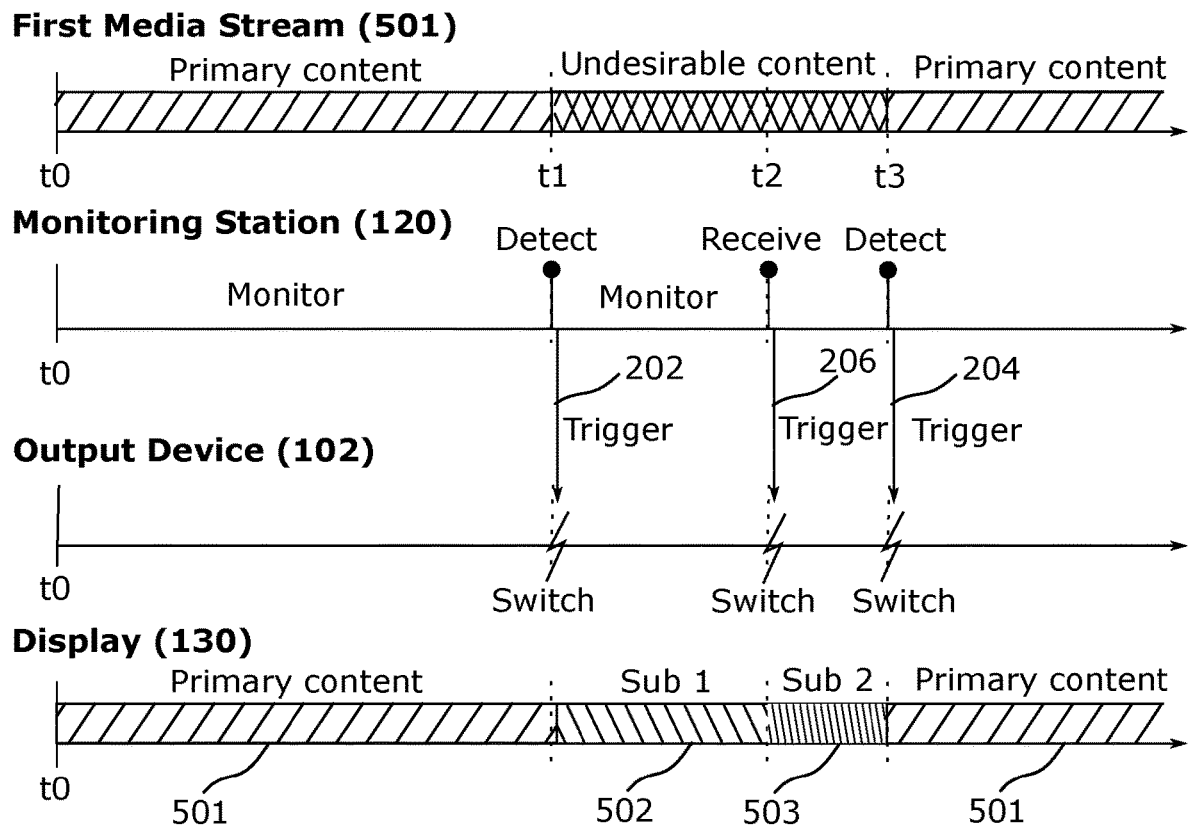
FIG. 5 is a timing diagram for another method of replacing undesirable content in a media stream.

FIG. 5 is a timing diagram for another method of replacing undesirable content in a media stream. In this embodiment, at time t2, monitoring station 120 receives a user preference indicating that substitute content is undesirable. The user may send a preference update through the user interface by methods previously discussed. In response to receiving the updated user preference, the monitoring station sends a third trigger signal 206, signaling the output device to switch from second media stream 502 to a third media stream 503. In some embodiments, when the system detects an end to undesirable content at t3, trigger 204 is sent and the display is switched back to primary content 501. In other embodiments, the system may wait for further user input after receiving a request to switch content.

Further provided is a software application for a computer system, such as an MCD, desktop computer, or smart TV, which includes a user interface and instructs the computer system to perform any of the methods of replacing undesirable content discussed herein.

Further provided is an output device which transmits media to a display viewable by a user, and includes a network interface in communication with the monitoring station. The network interface may include hardware for communicating via wired or wireless internet; broadcast, cable, or satellite communication, short-range wireless communication protocols, and combinations thereof.

The embodiments of the system and methods described herein are exemplary and numerous modifications, combinations, variations, and rearrangements can be readily envisioned to achieve an equivalent result, all of which are intended to be embraced within the scope of the appended claims. Further, nothing in the above-provided discussions of the system and method should be construed as limiting the invention to a particular embodiment or combination of embodiments. The scope of the invention is defined by the appended claims.

I claim:

1. A method of replacing undesirable content in a first media stream being received by an output device which transmits media to a display viewable by a user, the first media stream containing primary content having a primary content attribute, the method comprising the steps of:
   detecting in real-time, by a monitoring station, the undesirable content in the first media stream, wherein the undesirable content corresponds to a user preference indicating undesirability, the user preference indicating undesirability associated with the user and stored in a system database;
   selecting substitute content, by the monitoring station, wherein the substitute content has a plurality of substitute content attributes, at least one of the plurality of substitute content attributes associated with the primary content attribute and the primary content attribute associated with a first user preference indicating desirability, and at least one of the plurality of substitute content attributes directly associated with a second user preference indicating desirability;
   responsive to detecting in real-time the undesirable content in the first media stream, transmitting, from the monitoring station, a first trigger signal, and directing the output device to a second media stream containing the substitute content;
   further responsive to detecting in real-time the undesirable content in the first media stream, configuring, in the system database, an undesirable content attribute and associating the undesirable content attribute with the first media stream;
   wherein the output device switches from the first media stream to the second media stream in response to the first trigger signal;
   after transmitting the first trigger signal, monitoring, by the monitoring station, the first media stream for an end to the undesirable content;
   responsive to detecting the end to the undesirable content in the first media stream, transmitting, from the monitoring station, a second trigger signal to the output device;
   further responsive to detecting the end to the undesirable content in the first media stream, changing, in the system database, the undesirable content attribute associated with the first media stream; and,
   wherein the output device switches from the second media stream to the first media stream in response to the second trigger signal.

2. The method of claim 1, further including:
   prior to transmitting the first trigger signal, monitoring, by the monitoring station, the first media stream for the undesirable content.

3. The method of claim 1, further including:
   assigning, by the monitoring station, a substitute content attribute to the substitute content and storing the substitute content attribute in the system database.

4. The method of claim 1, further including:
   storing, in the system database, a directory of substitute content attributes and a directory of substitute content, each member of the directory of substitute content associated with at least one member of the directory of substitute content attributes;
   associating, by the monitoring station, at least one member of the directory of substitute content attributes with the primary content attribute; and,
   analyzing, by the monitoring station, the at least one member of the directory of substitute content attributes associated with the primary content attribute for correspondence to a user preference.

5. The method of claim 1, further including:
   soliciting a user preference corresponding to the substitute content.

6. The method of claim 1 wherein the at least one of the plurality of substitute content attributes associated with the primary content attribute is one of an event attribute, a location attribute, a genre attribute, a temporal attribute, a participant attribute, a keyword attribute, an image attribute, and combinations thereof.

7. The method of claim 1 wherein the substitute content is one of broadcast network content, cable network content, satellite network content, internet media, user generated content, shared content, and content stored in the system database.

8. The method of claim 1, further including:
after transmitting the first trigger signal, monitoring, by the monitoring station, the second media stream for another undesirable content corresponding to a user preference.

9. An article comprising a tangible medium that is not a transitory propagating signal encoding computer-readable instructions that, when applied to a computer system, instruct the computer system to perform a method of replacing undesirable content in a first media stream being received by an output device which transmits media to a display viewable by a user, the first media stream containing primary content having a primary content attribute, the method comprising the steps of:
communicating to a monitoring station a user preference indicating undesirability, the user preference indicating undesirability corresponding to the undesirable content;
receiving a first trigger signal from the monitoring station after the undesirable content corresponding to the user preference indicating undesirability is detected in real-time in the first media stream by the monitoring station and concurrent with an undesirable content attribute being associated with the first media stream and stored in the system database;
responsive to receiving the first trigger signal, signaling the output device to switch from the first media stream to a second media stream containing substitute content, wherein the substitute content has a plurality of substitute content attributes, at least one of the plurality of substitute content attributes associated with the primary content attribute and the primary content attribute associated with a first user preference indicating desirability, and at least one of the plurality of substitute content attributes directly associated with a second user preference indicating desirability;
receiving a second trigger signal from the monitoring station after an end to the undesirable content in the first media stream is detected by the monitoring station and concurrent with changing, in the system database, the undesirable content attribute associated with the first media stream; and,
responsive to receiving the second trigger signal, signaling the output device to switch from the second media stream to the first media stream.

10. The article according to claim 9, wherein the method further comprises:
communicating to the monitoring station a user preference corresponding to the substitute content.

11. The article according to claim 10, wherein the method further comprises:

receiving a third trigger signal from the monitoring station after the user preference corresponding to the substitute content is received by the monitoring station; and,
responsive to receiving the third trigger signal, signaling the output device to switch from the second media stream to a third media stream.

12. The article according to claim 9, wherein the method further comprises:
after transmitting the first trigger signal, monitoring, by the monitoring station, the second media stream for another undesirable content corresponding to a user preference.

13. An output device which transmits media to a display viewable by a user, the output device comprising:
a network interface in communication with a monitoring station;
wherein the network interface receives a first media stream containing primary content having a primary content attribute;
wherein the output device transmits the first media stream to the display;
wherein the network interface receives, from the monitor station, responsive to the monitor station detecting in real-time undesirable content in the first media stream, a first trigger signal and a second media stream containing substitute content, wherein the undesirable content corresponds to a user preference indicating undesirability, the user preference indicating undesirability associated with the user and stored in a system database, an undesirable content attribute associated with the first media stream and stored in the system database, and wherein the substitute content has a plurality of substitute content attributes, at least one of the plurality of substitute content attributes associated with the primary content attribute and the primary content attribute associated with a first user preference indicating desirability, and at least one of the plurality of substitute content attributes directly associated with a second user preference indicating desirability;
wherein the output device switches the media being transmitted to the display from the first media stream to the second media stream in response to the first trigger signal;
wherein the network interface receives, from the monitor station, responsive to the monitor station detecting an end to the undesirable content in the first media stream, a second trigger signal, wherein the undesirable content attribute associated with the first media stream and stored in the system database is changed; and,
wherein the output device switches the media being transmitted to the display from the second media stream to the first media stream in response to the second trigger signal.

14. The output device according to claim 13, wherein:
the network interface receives a third trigger signal from the monitoring station, responsive to a user input corresponding to the substitute content; and,
the output device switches the media being transmitted to the display from the second media stream to a third media stream in response to the third trigger signal.

* * * * *